United States Patent [19]

Guerci et al.

[11] Patent Number: 5,392,050
[45] Date of Patent: Feb. 21, 1995

[54] METHOD OF RECOGNIZING A RADAR TARGET OBJECT TYPE AND APPARATUS THEREFOR

[75] Inventors: Joseph R. Guerci, Astoria; Fred Comploier, E. Rockaway; Alicia Kee Hempstead, all of N.Y.

[73] Assignee: Grumman Aerospace Corporation, Bethpage, N.Y.

[21] Appl. No.: 105,407

[22] Filed: Aug. 12, 1993

[51] Int. Cl.6 .............................................. G01S 13/72
[52] U.S. Cl. ...................................... 342/90; 342/192
[58] Field of Search ................................. 342/90, 192

[56] References Cited

U.S. PATENT DOCUMENTS

| | | | |
|---|---|---|---|
| 3,772,689 | 11/1973 | Root, Jr. ............................... | 342/192 |
| 4,275,396 | 6/1981 | Jacomini ............................... | 342/192 |
| 4,707,697 | 11/1987 | Coulter et al. ........................ | 342/25 |
| 4,992,797 | 2/1991 | Gjessing et al. ..................... | 342/192 |
| 5,012,252 | 4/1991 | Faulkner .............................. | 342/192 |
| 5,068,664 | 11/1991 | Apprion et al. ..................... | 342/90 |
| 5,140,331 | 8/1992 | Aulenbacher et al. ............. | 342/165 |

Primary Examiner—Gilberto Barrón, Jr.
Attorney, Agent, or Firm—Collard & Roe

[57] ABSTRACT

In a method of recognizing a radar target object type, target range, heading and speed information are determined. A plurality of RCS for different targets of interest as a function of frequency and aspect angle are stored. Motion information of a platform on which a radar system is carried is determined. The target range, heading and speed information and the motion information of the platform with stored RCS, are processed, and what the observed radar pulse echo should be over the operational frequency band is predicted therefrom. Predicted information is compared with the measured pulse echoes to determine which target is present.

12 Claims, 3 Drawing Sheets

|  | MISSILE 1 | MISSILE 2 | MISSILE 3 | MISSILE 4 |
|---|---|---|---|---|
| MISSILE 1 | 95 | 5 | 0 | 0 |
| MISSILE 2 | 0 | 87 | 13 | 0 |
| MISSILE 3 | 0 | 42 | 58 | 0 |
| MISSILE 4 | 0 | 21 | 15 | 64 |

FIG. 3A

|  | MISSILE 1 | MISSILE 2 | MISSILE 3 | MISSILE 4 |
|---|---|---|---|---|
| MISSILE 1 | 100 | 0 | 0 | 0 |
| MISSILE 2 | 0 | 93 | 7 | 0 |
| MISSILE 3 | 0 | 19 | 81 | 0 |
| MISSILE 4 | 0 | 17 | 13 | 70 |

FIG. 3B

|  | MISSILE 1 | MISSILE 2 | MISSILE 3 | MISSILE 4 |
|---|---|---|---|---|
| MISSILE 1 | 100 | 0 | 0 | 0 |
| MISSILE 2 | 0 | 99 | 1 | 0 |
| MISSILE 3 | 0 | 6 | 94 | 0 |
| MISSILE 4 | 0 | 7 | 11 | 82 |

FIG. 3C

METHOD OF RECOGNIZING A RADAR TARGET OBJECT TYPE AND APPARATUS THEREFOR

BACKGROUND OF THE INVENTION

The present invention relates to a method of recognizing a radar target object type and apparatus therefor.

There is a non-cooperative target recognition (NCTR) problem when a radar system, which is either ground-based or airborne, attempts to recognize a target object type. Most existing or proposed radar NCTR systems require high range resolution, that is, large transmit bandwidths, polarization diversity and imaging, that is, SAR or ISAR, capability.

The principal object of the invention is to provide a method of recognizing a radar target object type, which method may be used by low frequency radars.

An object of the invention is to provide a method of recognizing a radar target object type, which method may be used by law enforcement radars.

Another object of the invention is to provide a method of recognizing a radar target object type, which method may be used by search radars in efforts to combat drug smuggling.

Still another object of the invention is to provide a method of recognizing a radar target object type, which method eliminates the need for, and does not require, high range resolution, polarization diversity and imaging capability.

Yet another object of the invention is to provide a method of recognizing a radar target object type, which method has few and readily completed steps.

Another object of the invention is to provide apparatus of simple structure, which is inexpensive in manufacture, for recognizing a radar target object type.

Still another object of the invention is to provide apparatus for recognizing a radar target object type, which apparatus is efficient, effective and reliable in operation.

Yet another object of the invention is to provide apparatus for recognizing a radar target object type, which apparatus has fewer components than known similar apparatus.

BRIEF SUMMARY OF THE INVENTION

In accordance with the invention, a method of recognizing a radar target object type comprises the steps of measuring a time versus frequency diagram of a target, storing a plurality of predicted time versus frequency diagrams for different targets, and comparing a measured time versus frequency diagram with the stored predicted time versus frequency diagrams and indicating the closest match whereby the target object type is determined. The time versus frequency diagram is two-dimensional.

In accordance with the invention, a method of recognizing a radar target object type comprises the steps of determining target range, heading and speed information, storing a plurality of radar candidate signatures systems (RCS) for different targets of interest as a function of frequency and aspect angle, determining motion information of a platform on which a radar system is carried, processing the target range, heading and speed information and the motion information of the platform with stored RCS, predicting therefrom what the observed radar pulse echo should be over the operational frequency band, and comparing predicted information with the measured pulse echoes to determine which target is present.

The step of predicting what the observed radar pulse echo should be over the operational frequency band includes the step of trigonometrically deriving the aspect angle from the target range, heading and speed information and the motion information of the platform. The predicted echo return is computed by convolving known transmitted pulses with the known target impulse response.

The method further comprises the steps of transforming the target range, heading and speed information and the motion information of the platform into the frequency domain and retaining only the amplitude information in the frequency domain and of concatenating all measurements thereby providing a two-dimensional time versus frequency diagram.

In accordance with the invention, apparatus for recognizing a radar target object type comprises measuring means for determining a time versus frequency diagram of a target. Storage means stores a plurality of predicted time versus frequency diagrams for different targets. Comparing means compares a measured time versus frequency diagram with the plurality of predicted time versus frequency diagrams and indicating the closest match whereby the target object type is determined. The time versus frequency diagram is two-dimensional.

In accordance with the invention, apparatus for recognizing a radar target object type comprises tracking computer means for determining target range, heading and speed information. The tracking computer means has an output. Library means stores a plurality of RCS for different targets of interest as a function of frequency and aspect angle. The library means has an input and an output. Inertial navigation means determines motion information of a platform on which a radar system is carried. The inertial navigation means has an output. TF NCTR processor means is electrically connected to the outputs of the tracking computer means, the library means and the inertial navigation means and to the input of the library means for processing the target range, heading and speed information and the motion information of the platform with stored RCS, predicting therefrom what the observed radar pulse echo should be over the operational frequency band and comparing predicted information with the measured pulse echoes to determine which target is present.

The TF NCTR processor means includes means for predicting what the observed radar pulse echo should be over the operational frequency band by trigonometrically deriving the aspect angle from the target range, heading and speed information and the motion information of the platform. The apparatus further comprises a transmitter for transmitting pulses in an operating frequency band and the TF NCTR processor means also includes means for convolving known transmitted pulses from the transmitter with the known target impulse response to compute the predicted echo return.

The TF NCTR processor means includes means for transforming the target range, heading and speed information and the motion information of the platform into the frequency domain and retaining only the amplitude information on the frequency domain and means for concatenating all measurements thereby providing a two-dimensional time versus frequency diagram.

BRIEF DESCRIPTION OF THE DRAWING

In order that the invention may be readily carried into effect, it will now be described with reference to the accompanying drawings, wherein:

FIG. 3A is a confusion matrix at a first time during the flyout;

FIG. 3B is a confusion matrix at a second time during the flyout; and

FIG. 3C is a confusion matrix at a third time during the flyout.

DETAILED DESCRIPTION OF PREFERRED EMBODIMENTS

The apparatus and method of the invention recognize a radar target object type by matching the observed or measured two-dimensional time-frequency (TF) diagram with a predicted TF diagram. In accordance with the invention, the two-dimensional TF diagram enables a low frequency, non-polarizing, non-imaging radar to perform NCTR.

As defined herein, a TF diagram is a two-dimensional field of RCS as a function of both time and operating frequency band. The RCS changes with time because the relative aspect angle of the target changes due to the motion of the radar system platform and/or the motion of the target.

Figure 1A:
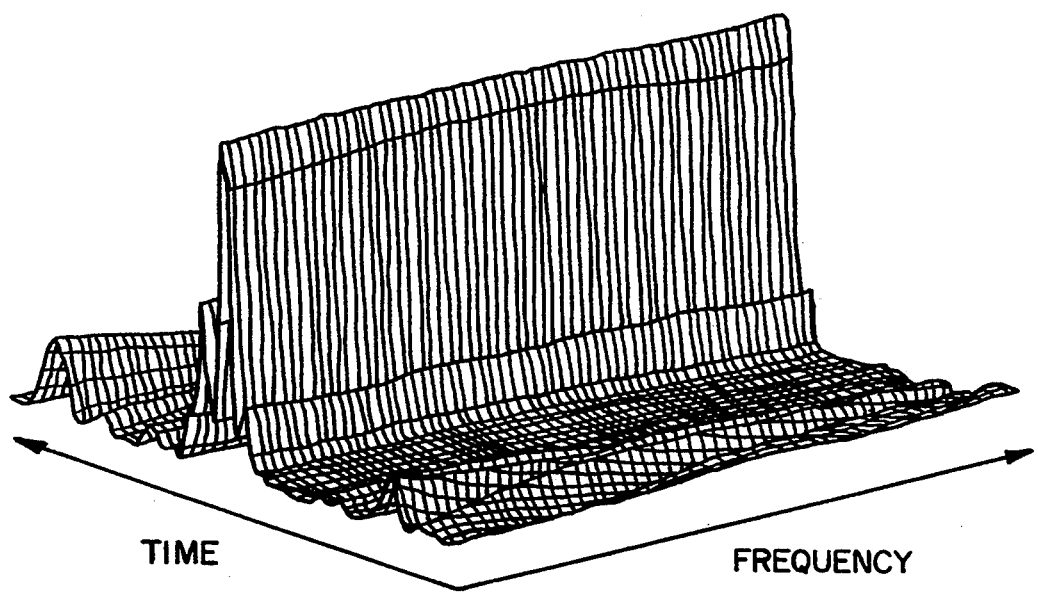
FIG. 1A is a time versus frequency diagram of a first type of cruise-like missile.
Figure 1B:
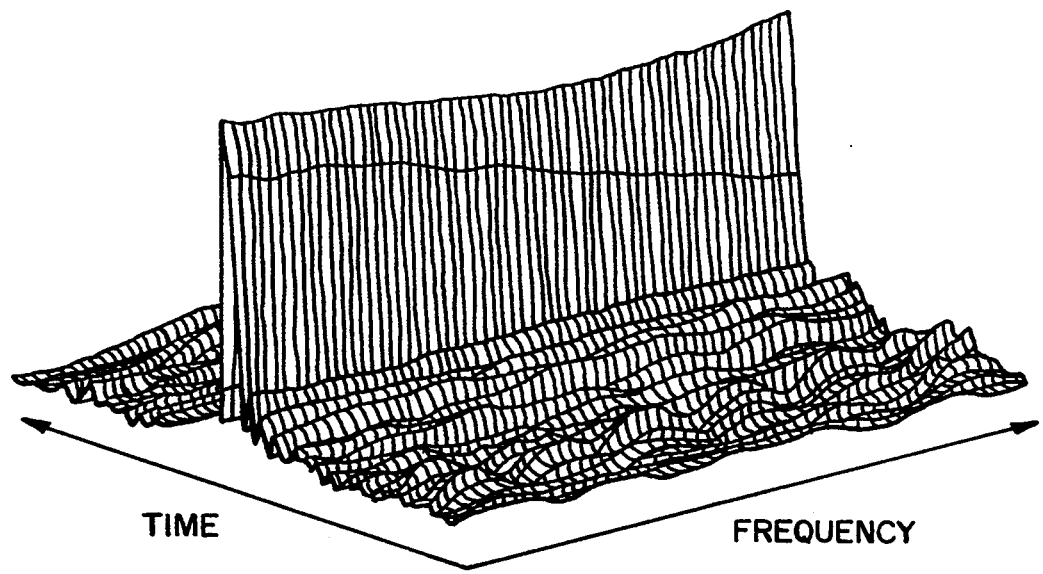
FIG. 1B is a time versus frequency diagram of a second type of cruise-like missile.

FIGS. 1A and 1B are examples of TF diagrams for two different types of cruise-like missiles for a UHF operating band. For the present application, the full complex (magnitude and phase) information of the received signals are not utilized. Only amplitude information is preserved, as shown in FIGS. 1A and 1B. This restriction is not necessary, but is included for practical reasons; for example, it considerably simplifies the on-line processing. The TF diagrams correspond to targets which are circling the observing radar at constant range and speed.

In accordance with the invention, the classification of a target using TF diagrams consists essentially of comparing the measured or observed TF diagram with TF diagrams in a RCS signature library to determine the best match. This is accomplished by the method and apparatus of the invention, an embodiment of which is shown in FIG. 2.

The apparatus of the invention for recognizing a radar target object type comprises a tracking computer 11 of any suitable known type for determining target range, heading and speed information. The tracking computer 11 has an output 12. A RCS signature library 13 of any suitable known type stores a plurality of RCS for different targets of interest as a function of frequency and aspect angle. The RCS signature library 13 has an input 14 and an output 15. An inertial navigation system 16 of any suitable known type determines motion information of a platform on which a radar system is carried. The inertial navigation system 16 has an output 17.

Figure 2:
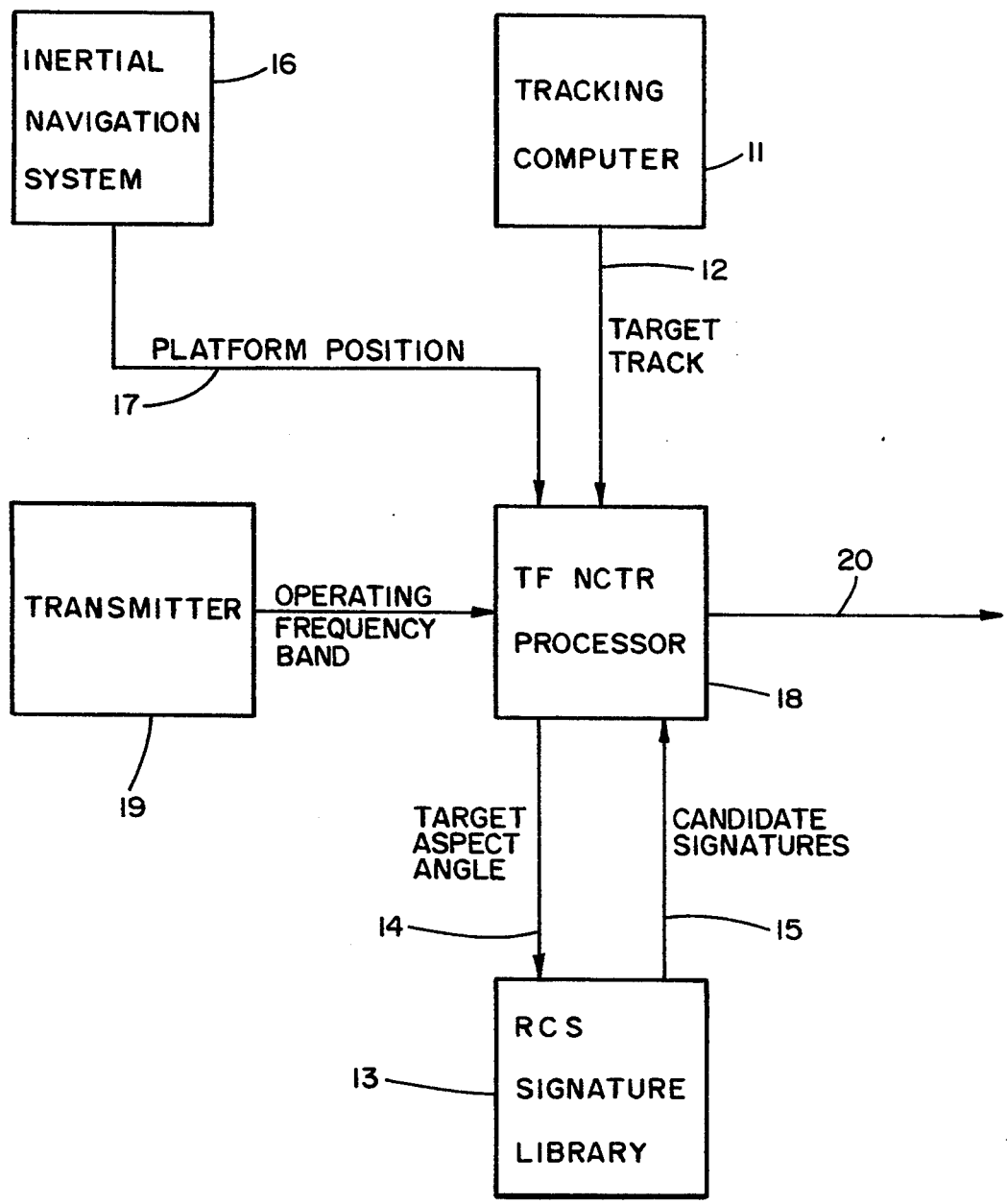
FIG. 2 is a block diagram of an embodiment of the apparatus of the invention for recognizing a radar target object type.

As shown in FIG. 2, the apparatus of the invention includes a TF NCTR processor 18 of any suitable known type electrically connected to the output 12 of the tracking computer 11, the output 15 of the RCS signature library 13 and the output 17 of the inertial navigation system 16. The TF NCTR processor processes the target range, heading and speed information and the motion information of the platform on which the radar system is carried with stored RCS and predicts therefrom what the observed radar pulse echo should be over the operational frequency band. The TF NCTR processor 18 then compares predicted information with the measured pulse echoes to determine which target is present.

The TF NCTR processor 18 predicts what the observed radar pulse echo should be over the operational frequency band by trigonometrically deriving the aspect angle from the target range, heading and speed information and the motion information of the platform on which the radar system is carried. This is accomplished in the standard manner by convolving known transmitted pulses in the operating frequency band, output by a transmitter 19, with the known target impulse response to compute the predicted echo return.

The TF NCTR processor 18 transforms the target range, heading and speed information and the motion information, of the platform on which the radar system is carried, into the frequency domain and retains only the amplitude information in the frequency domain. The TF NCTR processor 18 also concatenates, or links together, all measurements after the predicted information is compared with the measured pulse echoes, as hereinbefore mentioned, to determine which target is present. The concatenation of all the measurements, repeated as more radar pulses become available, produces a two-dimensional TF diagram.

The TF NCTR processor 18 has an output 20 at which the target type and relevant sufficient statistics, for example, confidence levels, which may be fused with other sensor data at a higher processing level, are provided.

The optimal procedure for matching a measured TF diagram with predicted ones depends on the nature of the measurement "noise". Under the usual normality assumptions, a maximum likelihood procedure would be employed. That is, the problem would be reduced to the classical hypothesis testing procedure. Thus, for example, if the measurement noise, which includes receiver noise, inertial navigation system (INS) noise, target scintillation, target RCS modeling errors, etc., is modeled Gaussian, wide sense stationary, and "white" then the optimal hypothesis testing strategy would be to determine which predicted TF diagram best fits the observed data in a "least squares" sense. That is, $$\min_{\text{(all predicted TFs)}} (TF_{meas} - TF_{pred})^{\Delta 2}$$

where $TF_{meas}$ and $TF_{pred}$ denote the measured and predicted TF diagrams, respectively, and $\Delta 2$ denotes the element squaring operation. A weighted least squares procedure could be employed for the more general case, for example, non-stationary, non-white noise.

In a special, but important, case when the "absolute" RCS of the target is not known, the aforedescribed procedure would be modified to include an unknown scale factor k. In such case, the (TF,k) pair which minimized the element squares criterion would be selected. That is, $$\min_{\text{(all predicted } (TF,k)s)} (TF_{meas} - kTF_{pred})^{\Delta 2}.$$

A computer aided Monte Carlo simulation was performed in order to demonstrate the feasibility of the method and apparatus of the invention. Four different "cruise-like" missile targets were employed. Table I summarizes the simulation parameters utilized.

TABLE I

| SIMULATION PARAMETERS | |
| --- | --- |
| Aspect angle accuaracy = | 2 deg. rms |
| Operating band = | 400–460 MHz |
| Total flyout time = | 10 minutes |
| Initial target heading, = | 30 deg (off of line-of-sight) |
| Initial target range = | 200 nautical miles |
| Pulse update time = | 10 seconds |

The "confusion" matrices at three different times during the "flyout" are shown in FIGS. 3A, 3B and 3C. Although these targets are not too dissimilar, the TF NCTR processor 18 is still able to discriminate between them. The time of the first matrix of FIG. 3A is 10 seconds. The time of the second matrix of FIG. 3B is 30 seconds. The time of the third matrix of FIG. 3C is 60 seconds. The results generally improve with time, since a larger two-dimensional TF field is available for matching.

The method of the invention of recognizing a radar target object type comprises the step of measuring a time versus frequency diagram of a target. A plurality of predicted time versus frequency diagrams are stored for different targets and a measured time versus frequency diagram is compared with the stored predicted time versus frequency diagrams and the closest match is indicated, whereby the target object type is determined. The time versus frequency diagram is two-dimensional.

In the method of the invention, target range, heading and speed information are determined. A plurality of RCS for different targets of interest as a function of frequency and aspect angle are stored. Motion information of a platform on which a radar system is carried is determined. The target range, heading and speed information and the motion information of the platform with stored RCS, are processed, and what the observed radar pulse echo should be over the operational frequency band is predicted therefrom. Predicted information is compared with the measured pulse echoes to determine which target is present.

The method of the invention includes predicting what the observed radar pulse echo should be over the operational frequency band. This includes trigonometrically deriving the aspect angle from the target range, heading and speed information and the motion information of the platform. The predicted echo return is computed by convolving known transmitted pulses with the known target impulse response. The target range, heading and speed information and the motion information of the platform are transformed into the frequency domain and only the amplitude information in the frequency domain is retained. All measurements are concatenated, thereby providing a two-dimensional time versus frequency diagram.

While a single embodiment of the present invention has been shown and described, it is to be understood that many changes and modifications may be made thereunto without departing from the spirit and scope of the invention as defined in the appended claims.

What is claimed is:

1. A method of recognizing a radar target object type using non-cooperative target recognition (NCTR), said method comprising the steps of:
   determining target range, heading and speed information;
   measuring a time verses frequency diagram of a target using said target range, heading and speed information of the target, said time versus frequency diagram being two-dimensional, said two-dimensional time versus frequency diagram enabling a low frequency, non-polarizing, non-imaging radar to perform NCTR;
   storing a plurality of predicted time versus frequency diagrams for different targets; and
   applying the least squares method of calculation for the measured time versus frequency diagram and the stored predicted time versus frequency diagrams and indicating the closest match whereby the target object type is determined.

2. A method of recognizing a radar target object type, said method comprising the steps of
   determining target range, heading and speed information;
   storing a plurality of RCS for different targets of interest as a function of frequency and aspect angle;
   determining motion information of a platform on which a radar system is carried;
   processing said target range, heading and speed information and said motion information of said platform with stored RCS, predicting therefrom what the observed radar pulse echo should be over the operational frequency band; and
   comparing predicted information with the measured pulse echoes to determine which target is present.

3. A method as claimed in claim 2, wherein the step of predicting what the observed radar pulse echo should be over the operational frequency band includes the step of trigonometrically deriving the aspect angle from said target range, heading and speed information and said motion information of said platform.

4. A method as claimed in claim 3, wherein the predicted echo return is computed by convolving known transmitted pulses with the known target impulse response.

5. A method as claimed in claim 2, further comprising the steps of transforming said target range, heading and speed information and said motion information of said platform into the frequency domain and retaining only the amplitude information in said frequency domain.

6. A method as claimed in claim 2, further comprising the step of concatenating all measurements thereby providing a two-dimensional time versus frequency diagram.

7. Apparatus or recognizing a radar target object type having a target range, heading and speed, said apparatus comprising:
   measuring means for determining a time versus frequency diagram of a target, said measuring means utilizing the target range, heading and speed of the target to produce said time versus frequency diagram;
   storage means for storing a plurality of predicted time versus frequency diagrams for different targets; and comparing means for applying the least squares method of calculation to the measured time versus frequency diagram and the plurality of predicted time versus frequency diagrams and indicating the closest match whereby the target object type is determined.

8. Apparatus for recognizing a radar target object type, said apparatus comprising tracking computer means for determining target range, heading and speed information, said tracking computer means having an output;

library means for storing a plurality of RCS for different targets of interest as a function of frequency and aspect angle, said library means having an input and an output;

inertial navigation means for determining motion information of a platform on which a radar system is carried, said inertial navigation means having an output; and TF NCTR processor means electrically connected to the outputs of said tracking computer means, said library means and said inertial navigation means and to the input of said library means for processing the target range, heading and speed information and said motion information of said platform with stored RCS, predicting therefrom what the observed radar pulse echo should be over the operational frequency band and comparing predicted information with the measured pulse echoes to determine which target is present.

9. Apparatus as claimed in claim 8, wherein said TF NCTR processor means includes means for predicting what the observed radar pulse echo should be over the operational frequency band by trigonometrically deriving the aspect angle from said target range, heading and speed information and said motion information of said platform.

10. Apparatus as claimed in claim 9 further comprising transmitter means for transmitting pulses in an operating frequency band and wherein said TF NCTR processor means includes means for convolving known transmitted pulses from said transmitter means with the known target impulse response to compute the predicted echo return.

11. Apparatus as claimed in claim 8, wherein said TF NCTR processor means includes means for transforming said target range, heading and speed information and said motion information of said platform into the frequency domain and retaining only the amplitude information in said frequency domain.

12. Apparatus as claimed in claim 8, wherein said TF NCTR processor means includes means for concatenating all measurements thereby providing a two-dimensional time versus frequency diagram.

* * * * *